United States Patent
Bourdeau et al.

(10) Patent No.: US 11,028,801 B2
(45) Date of Patent: Jun. 8, 2021

(54) GRATING FOR THE FORMATION OF A REVERSE FLOW OF AN AIRCRAFT TURBOFAN ENGINE

(71) Applicant: Airbus Operations SAS, Toulouse (FR)

(72) Inventors: Christophe Bourdeau, Toulouse (FR); Quentin Vaucouloux, Plaisance du Touch (FR); Romain Cusset, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 438 days.

(21) Appl. No.: 16/201,265

(22) Filed: Nov. 27, 2018

(65) Prior Publication Data

US 2020/0025138 A1    Jan. 23, 2020

(30) Foreign Application Priority Data

Dec. 11, 2017 (FR) ........................................ 1761914

(51) Int. Cl.
*F02K 1/72* (2006.01)

(52) U.S. Cl.
CPC ...................................... *F02K 1/72* (2013.01)

(58) Field of Classification Search
CPC .... F02C 7/18; F02C 7/185; F02C 7/12; F02C 7/14; F02C 7/04; F02C 9/18; F02C 6/08; B64D 33/02; F05D 2240/129; F02K 1/72
See application file for complete search history.

(56) References Cited

U.S. PATENT DOCUMENTS

| | | | | |
|---|---|---|---|---|
| 2,945,346 A | * | 7/1960 | Arnzen | F02K 1/60 239/265.29 |
| 4,073,440 A | * | 2/1978 | Hapke | F02K 1/74 239/265.29 |
| 4,948,072 A | * | 8/1990 | Garland | F02K 1/002 239/265.25 |
| 5,090,197 A | * | 2/1992 | Dubois | F02K 1/70 60/226.2 |
| 5,485,958 A | * | 1/1996 | Nightingale | F01D 17/162 239/265.19 |
| 5,507,143 A | * | 4/1996 | Luttgeharm | F02K 1/563 239/265.31 |

(Continued)

FOREIGN PATENT DOCUMENTS

EP    2581593 A2    4/2013

OTHER PUBLICATIONS

French Search Report; priority document.

*Primary Examiner* — Craig Kim
(74) *Attorney, Agent, or Firm* — Greer, Burns & Crain, Ltd.

(57) ABSTRACT

A grating for the formation of a reverse flow of a turbofan engine and comprising fins of a first type having a curved profile whose rounding is oriented aft and whose center of curvature is forward relative to the fin of the first type, fins of a second type having a curved profile whose rounding is oriented aft and whose center of curvature is forward relative to the fin of the second type. In this grating, each fin of one of the two types is inserted between two fins of the other type moving from forward to aft and the cord of the fins of the second type is smaller than the cord of the fins of the first type.

10 Claims, 3 Drawing Sheets

(56) References Cited

U.S. PATENT DOCUMENTS

| | | | |
|---|---|---|---|
| 7,484,355 B2* | 2/2009 | Blin | F02K 1/72 60/226.2 |
| 7,866,142 B2* | 1/2011 | Beardsley | F02C 7/32 60/226.2 |
| 8,453,429 B2* | 6/2013 | Gabel | F02K 1/72 60/226.2 |
| 8,677,733 B2* | 3/2014 | Beardsley | F02K 3/075 60/226.2 |
| 8,696,306 B2* | 4/2014 | Clemen | F02K 3/06 415/144 |
| 9,086,034 B2 | 7/2015 | Aten et al. | |
| 9,091,174 B2* | 7/2015 | Bagnall | F04D 29/544 |
| 9,982,627 B2* | 5/2018 | Teia Dos Santos Mendes Gomes | F01D 17/105 |
| 10,113,507 B2* | 10/2018 | Starovic | F02K 1/72 |
| 10,502,161 B2* | 12/2019 | Crawford | F02K 1/72 |
| 2008/0010969 A1* | 1/2008 | Hauer | F02K 1/72 60/204 |
| 2008/0072571 A1* | 3/2008 | Beardsley | F01D 25/162 60/226.2 |
| 2012/0036716 A1* | 2/2012 | Urban | F02K 1/72 29/889 |
| 2013/0051996 A1 | 2/2013 | Hoeger et al. | |
| 2013/0067884 A1* | 3/2013 | Bhatt | F02K 1/70 60/204 |
| 2014/0027536 A1* | 1/2014 | Gormley | F02K 1/70 239/265.19 |
| 2016/0146156 A1* | 5/2016 | Crawford | F02K 1/72 239/265.27 |
| 2016/0230702 A1* | 8/2016 | Charron | F02K 1/72 |
| 2016/0341150 A1* | 11/2016 | Chuck | F02K 1/76 |
| 2017/0058829 A1 | 3/2017 | Dong | |
| 2017/0321602 A1* | 11/2017 | Guijarro Valencia | B64D 33/02 |

* cited by examiner

GRATING FOR THE FORMATION OF A REVERSE FLOW OF AN AIRCRAFT TURBOFAN ENGINE

CROSS-REFERENCES TO RELATED APPLICATIONS

This application claims the benefit of the French patent application No. 1761914 filed on Dec. 11, 2017, the entire disclosures of which are incorporated herein by way of reference.

BACKGROUND OF THE INVENTION

The present invention relates to a grating for the formation of a reverse flow of a turbofan engine of an aircraft, a turbofan engine comprising at least one such grating, and an aircraft comprising at least one such turbofan engine.

An aircraft comprises a fuselage, on each side of which is fixed a wing. Under each wing, there is suspended at least one turbofan engine. Each turbofan engine is fixed under the wing via a pylon which is fixed between the structure of the wing and the structure of the turbofan engine.

The turbofan engine comprises an engine in the form of a core and a nacelle which is fixed around the engine to a fixed structure of the jet engine. Between the engine and the nacelle, the jet engine has a secondary jet in which there flows, from upstream to downstream, a secondary flow of gasses originating from a fan positioned upstream of the engine.

The nacelle comprises a cowl that is fixed relative to the fixed structure and, forward, a mobile cowl which moves translationally aft to free a window between the mobile cowl and the fixed cowl and which allows the passage of gasses between the secondary jet and the outside.

Initially, one or more blocker doors are displaced from an inactive position to an active position. In the inactive position, the blocker door is outside of the secondary jet and does not prevent the flow of the secondary flow. In the active position, the blocker door is across the secondary jet and directs the secondary flow from the secondary jet to the window and therefore to the outside.

The displacements of the mobile cowl and of the blocker doors are produced by a control system comprising, for example, thrusters and rods.

To best guide the flow outgoing through the window, gratings, also called "cascades," are positioned across the window to enhance the efficiency of the reverser by more accurately controlling the direction of the diverted secondary flow.

These gratings take the form of profiled fins which divert the secondary flow. Each fin has a curved profile whose rounding is oriented aft and whose center of curvature is forward relative to the fin. While these fins allow a good deflection of the secondary flow forward, the air flow at the output of the grating tends to separate at the trailing edge of each fin, which tends to reduce the performance of the grating.

To ensure a better efficiency of these gratings, it is necessary to find fin forms which are more efficient from an aerodynamic point of view and from a weight point of view.

SUMMARY OF THE INVENTION

One object of the present invention is to propose a grating for the formation of a reverse flow of a turbofan engine of an aircraft.

To this end, a grating is proposed for the formation of a reverse flow of a turbofan engine having a forward end and an aft end, the grating comprising fins of a first type having a curved profile whose rounding is intended to be oriented aft and whose center of curvature is forward relative to the fin of the first type, the grating being characterized in that it comprises fins of a second type, in that each fin of one of the two types is inserted between two fins of the other type moving from forward to aft, in that each fin of the second type has a curved profile whose rounding is configured to be oriented aft and whose center of curvature is forward relative to the fin of the second type, and in that the cord of the fins of the second type is smaller than the cord of the fins of the first type.

Such a grating allows for a reduction of the weight while ensuring an efficient diversion.

Advantageously, the trailing edges of the fins of the first type and the trailing edges of the fins of the second type are in one and the same output plane.

Advantageously, the leading edges of the fins of the first type are in one and the same input plane parallel to the output plane, and in that the leading edge of each fin of the second type is in an intermediate plane between the input plane and the output plane and at a distance from each of them.

Advantageously:

$$0.2 \times s \leq s' \leq 0.8 \times s;$$

$$0.2 \times h \leq h' \leq 0.8 \times h;\ \text{with } 30\ \text{mm} \leq h \leq 70\ \text{mm};$$

$$-1.5 \times \theta_1 \leq \theta_{1'} \leq 1.5 \times \theta_1;\ \text{with } -10° \leq \theta_1 \leq 70°;$$

$$-1.5 \times \theta_2 \leq \theta_{2'} \leq 1.5 \times \theta_2;\ \text{with } 0° \leq \theta_2 \leq 50°;$$

$$c' = \frac{h'}{\cos(st')}\ \text{with } 0° \leq st' \leq \theta_{2'};\ \text{and}$$

$$0.5 \leq \frac{c}{s} \leq 2;\ \text{with } c = \frac{h}{\cos(st)}\ \text{and } 0° \leq st \leq \theta_2;$$

where "c" is the cord of the fins of the first type,
"c'" is the cord of the fins of the second type,
"s" is the distance between two consecutive fins of the first type,
"s'" is the distance between a fin of the first type and a consecutive fin of the second type,
"h" is the height of the fins of the first type,
"h'" is the height of the fins of the second type,
"θ1" is the input angle between the tangent to the curvature of the leading edge of the fins of the first type and the vertical axis,
"θ1'" is the input angle between the tangent to the curvature of the leading edge of the fins of the second type and the vertical axis,
"θ2" is the output angle between the tangent to the curvature of the trailing edge of the fins of the first type and the vertical axis,
"θ2'" is the output angle between the tangent to the curvature of the trailing edge of the fins of the second type and the vertical axis,
"st" is the offset angle of the fins of the first type, and
"st'" is the offset angle of the fins of the second type.

According to a particular embodiment, the heights of the fins of the second type vary from one fin of the second type to another fin of the second type.

According to a particular embodiment, the distance between a fin of the first type and the consecutive fin of the second type in the forward to aft direction, is different from the distance between another fin of the first type and the fin of the second type consecutive in the forward to aft direction to this other fin of the first type.

According to a particular embodiment, the input angles of the fins of the second type vary from one fin of the second type to another fin of the second type.

The invention also proposes a turbofan engine comprising at least one grating for the formation of a reverse flow according to one of the preceding variants.

The invention also proposes an aircraft comprising at least one turbofan engine according to the preceding variant.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
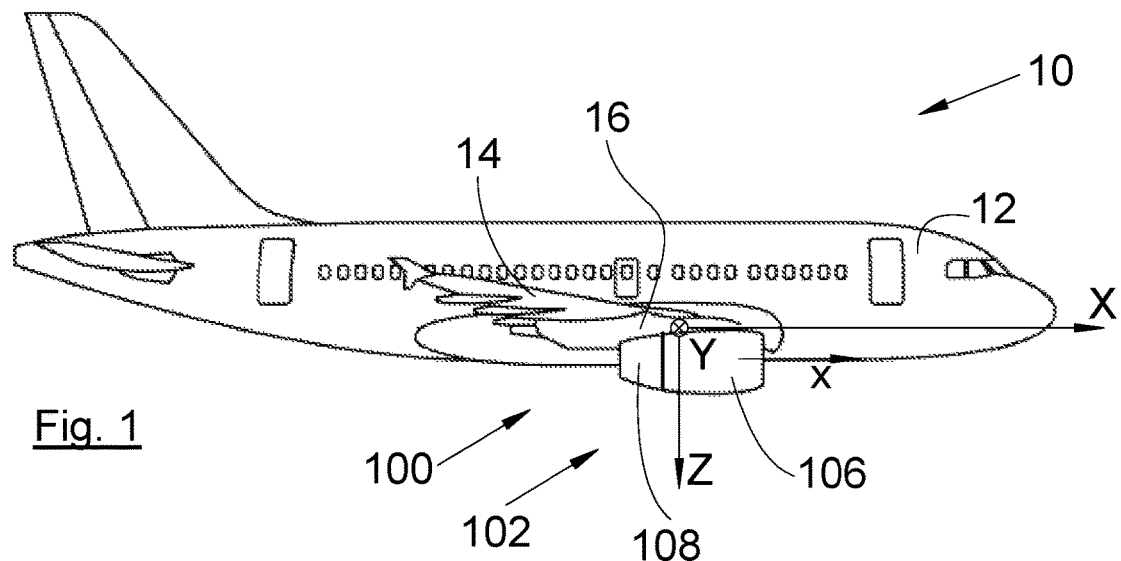
FIG. 1 is a side view of an aircraft comprising a turbofan engine according to the invention.

In the following description, the terms relating to a position are taken with reference to an aircraft in an advancing position as is represented in FIG. 1.

FIG. 1 shows an aircraft 10 which comprises a fuselage 12, on each side of which is fixed a wing 14 which bears at least one turbofan engine 100 according to the invention. The turbofan engine 100 is fixed under the wing 14 via a pylon 16.

In the following description, and by convention, X will denote the longitudinal axis of the nacelle 102 and of the turbofan engine 100 which is overall parallel to the longitudinal axis X of the aircraft 10, or roll axis, oriented positively in the direction of advance of the aircraft 10, Y denotes the transverse axis or pitch axis of the aircraft which is horizontal when the aircraft is on the ground, and Z denotes the vertical axis or vertical height or yaw axis when the aircraft is on the ground, these three directions X, Y and Z being mutually orthogonal and forming an orthonormal reference frame whose origin is the center of gravity of the aircraft.

The turbofan engine 100 comprises a nacelle 102 which comprises, forward, a fixed cowl 106 and, rearward of the fixed cowl 106 relative to the longitudinal axis X, a mobile cowl 108.

Figure 2:
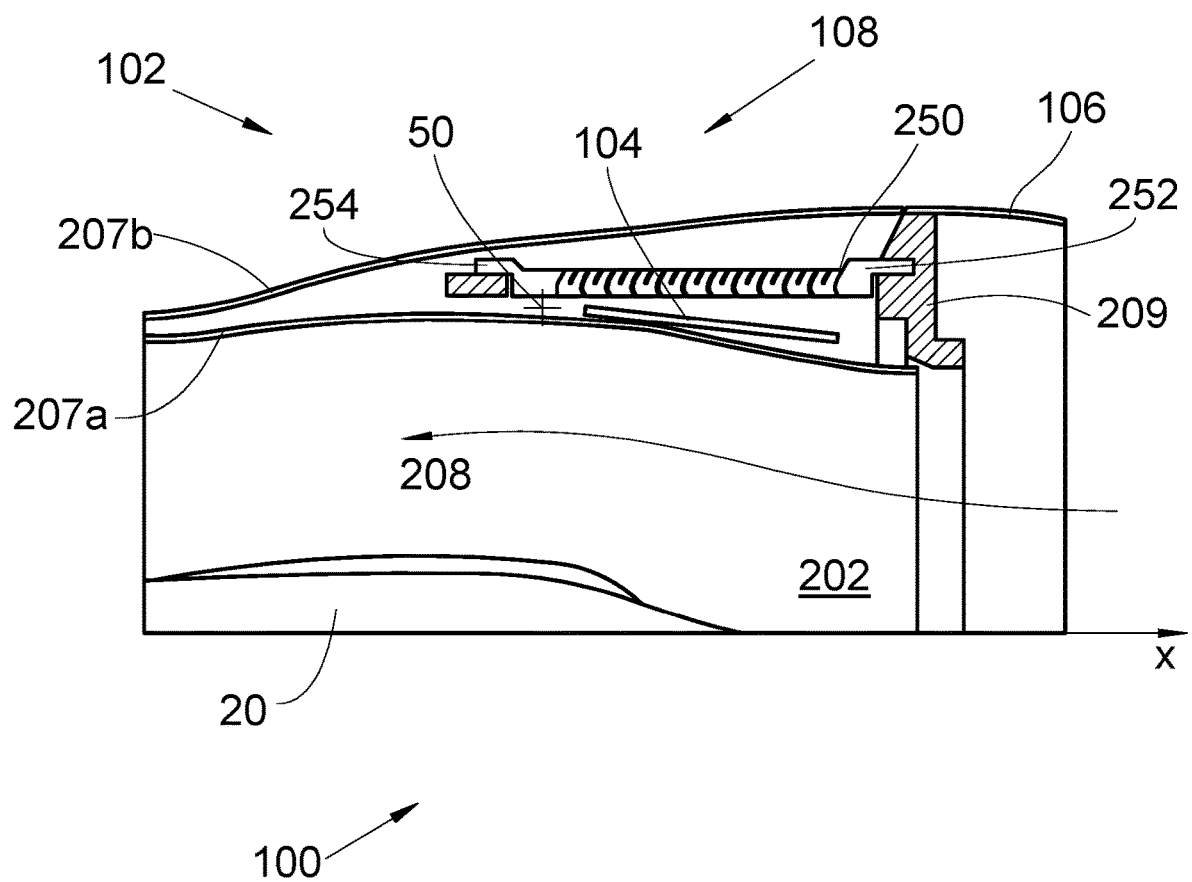
FIG. 2 is a cross-sectional view through a median plane of the jet engine according to the invention in closed position.
Figure 3:
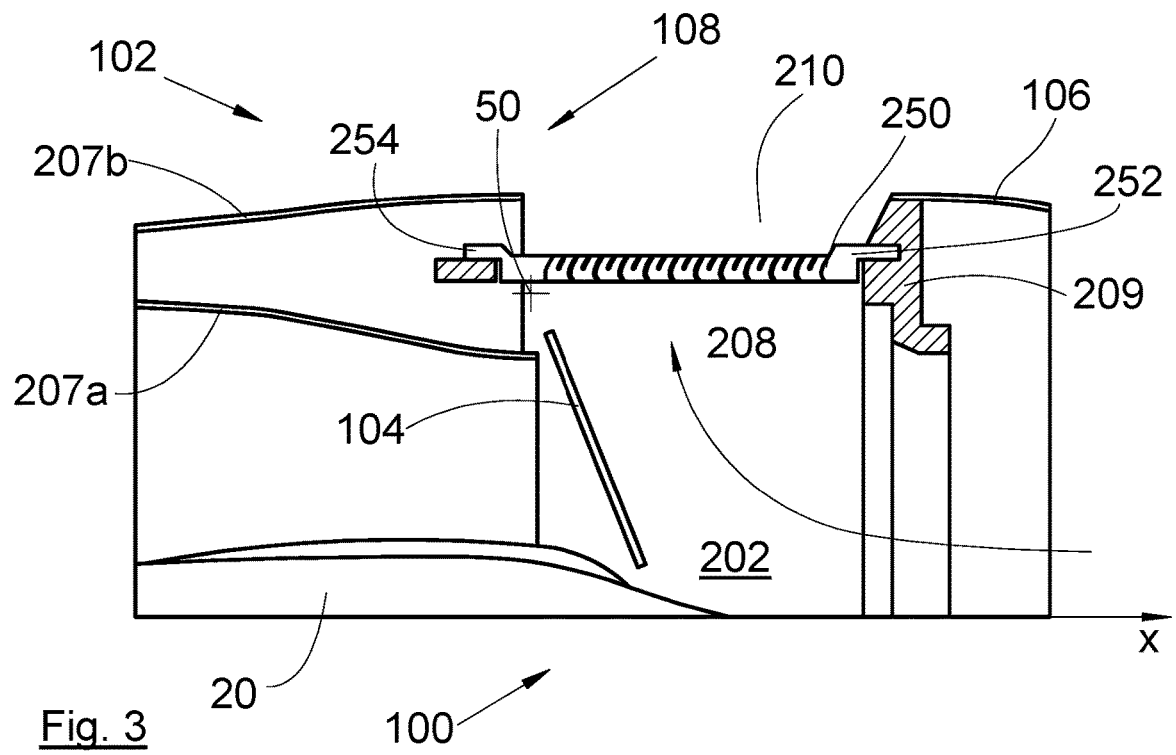
FIG. 3 is a cross-sectional view similar to that of FIG. 2 in open position.

As is shown in FIGS. 2 and 3, the turbofan engine 100 comprises an engine 20 in the form of a core which is housed inside the nacelle 102. The jet engine 100 has a jet 202 delimited between the nacelle 102 and the engine 20 and in which circulates a secondary flow 208 originating from an upstream fan.

The fixed cowl 106 is fixedly mounted on a fixed structure 209 of the nacelle 102 and constitutes an outer wall of the nacelle 102.

The mobile cowl 108 is mounted to be translationally mobile on the fixed structure 209 in a direction of translation that is overall parallel to the longitudinal axis X. The translation is produced by any appropriate means such as, for example, runners, or by any actuation systems such as, for example, thrusters or motors.

In the embodiment of the invention presented here, the mobile cowl 108 comprises an inner wall 207a and an outer wall 207b which surrounds the inner wall 207a.

The mobile cowl 108 is mobile between a position of closure (FIG. 2) in which the mobile cowl 108 is against the fixed cowl 106 and a position of opening (FIG. 3) in which the mobile cowl 108 is moved away from the fixed cowl 106 aft so as to open a window 210 open to the outside of the nacelle 102 and which opens a passage between the secondary jet 202 and the outside. In the position of closure, the fixed cowl 106 and the outer wall 207b are extended to form the outer jacket of the nacelle 102 and to close the window 210, and in the position of opening, the fixed cowl 106 and the outer wall 207b are separated from one another.

At the same time, in the position of closure, the inner wall 207a comes into contact with the fixed structure 209 and constitutes an outer wall of the secondary jet 202, and, in the position of opening, the inner wall 207a is moved away from the fixed structure 209 so as to open the passage between the secondary jet 202 and the window 210.

The nacelle 102 comprises at least one blocker door 104. In particular, there can be two blocker doors 104 positioned facing one another, or several, for example four, blocker doors 104 distributed regularly over the periphery of the nacelle 102.

The thrust reversing system which is described here is described only by way of illustration and the invention can be applied to any type of thrust reverser for which cascades are used in order to increase the efficiency of the thrust forward of the nacelle.

Furthermore, here, the invention is more particularly described for a single blocker door 104, but it applies in the same way for each blocker door 104 when there are several thereof.

In the embodiment of the invention presented here, the blocker door 104 is positioned between the inner wall 207a and the outer wall 207b in the position of closure.

The blocker door 104 is mounted to rotate freely about an axis of rotation 50 on the fixed structure of the nacelle 102 between an inactive position (FIG. 2) in which it is not in the jet 202 and an active position (FIG. 3) in which it at least partly blocks the jet 202.

When the mobile cowl 108 is in the position of closure, the blocker door 104 is in the inactive position, and when the mobile cowl 108 is in the position of opening, the blocker door 104 is in the active position so as to divert at least a part of the secondary flow 208 to the outside of the nacelle 102.

The displacement of the blocker door 104 is linked to the displacement of the mobile cowl 108. The displacement of the blocker door 104 is controlled by any appropriate means, such as a system of rods, thrusters or motors.

Thus, in the position of opening of the mobile cowl 108 and in the active position of the blocker door 104, the secondary flow 208 is diverted to the outside through the window 210.

Figure 4:
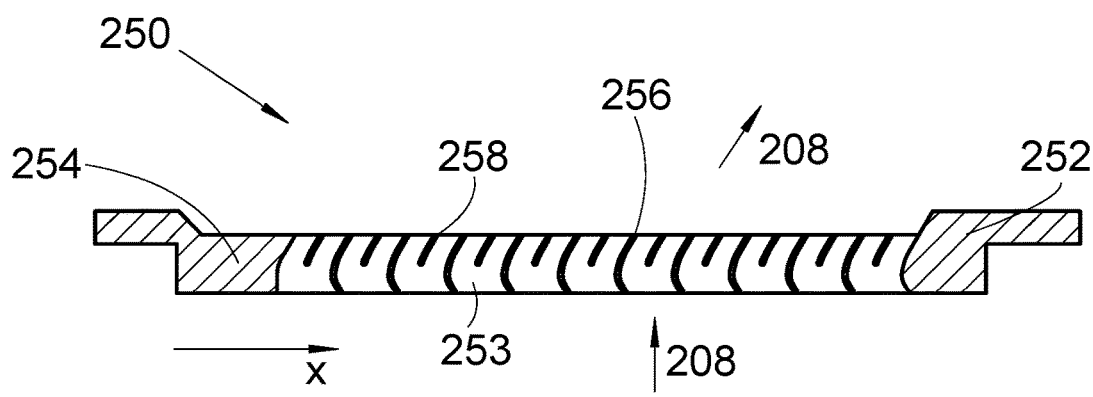
FIG. 4 shows a side view of a grating according to the invention.

For each window 210, the nacelle 102 is equipped with gratings 250 which allow the formation of a reverse gas flow of the jet engine 100 from the secondary gas flow 208, also known as "cascades", which are positioned across the window 210 to enhance the efficiency of the reverser by more accurately controlling the direction of a diverted secondary flow 208 and, in particular, by orienting the secondary flow into a direction forward of the nacelle 102. FIG. 4 shows the grating 250 on its own and in cross section.

The number of gratings 250 per window 210 varies according to the dimensions of the gratings 250 and of the window 210. In the following description, the invention is more particularly described for a single grating 250, but it applies in the same way for each grating 250 when there are several thereof.

The grating 250 takes the form of a frame having an upstream edge 252 and a downstream edge 254 parallel to the upstream edge 252, and lateral edges 253 at right angles to the upstream 252 and downstream 254 edges. The grating 250 is fixed to the fixed structure of the nacelle 102, for example by screws.

Inside the frame, the grating 250 has fins 256 of a first type and fins 258 of a second type, where each fin 256, 258 of one of the two types is inserted between two fins 258, 256 of the other type going along the longitudinal axis X, that is to say, from forward to aft of the jet engine 100.

Each fin 256 of the first type has a curved profile whose rounding is oriented aft of the jet engine 100 and whose center of curvature is forward relative to the fin 256 of the first type. Each fin 256 of the first type therefore makes it possible to divert the secondary flow 208 forward.

Each fin 258 of the second type also has a curved profile whose rounding is oriented aft of the jet engine 100 and whose center of curvature is forward relative to the fin 258 of the second type, but whose chord is smaller than the chord of the fins 256 of the first type.

Thus, with respect to the secondary flow 208 entering into the grating 250, each fin 258 of the second type has a drag which is lower than the drag of the fins 256 of the first type. Since the fins 258 of the second type are smaller than the fins 256 of the first type, they are less heavy, hence a weight saving, and they make it possible, by reducing the output surface of the secondary flow 208, to create a convergent section and speed up the secondary flow 208 at the output of the grating 250 and thus reduce the separation of the air flow at the fins 256 of the first type.

The trailing edges of the fins 256 of the first type and the trailing edges of the fins 258 of the second type are aligned in a direction that is overall parallel to the longitudinal axis x. In other words, the trailing edges of all the fins 256 and 258 are all in one and the same output plane that is overall parallel to the longitudinal axis X. This output plane may be curved to follow the curvature of the nacelle, such as a surface of revolution about the longitudinal axis of the engine.

On the other hand, the leading edges of the fins 256 of the first type and the leading edges of the fins 258 of the second type are not aligned in a direction that is overall parallel to the longitudinal axis X. The leading edges of the fins 256 of the first type are all in one and the same input plane parallel to the output plane and the leading edge of each fin 258 of the second type is in an intermediate plane between the input plane and the output plane and at a distance from each of them. The input plane and the intermediate plane may also be curved in the same manner as the output plane to follow the curvature of the nacelle, such as a surface of revolution about the longitudinal axis of the engine, with all of the input, output and intermediate planes being concentric.

Figure 5:
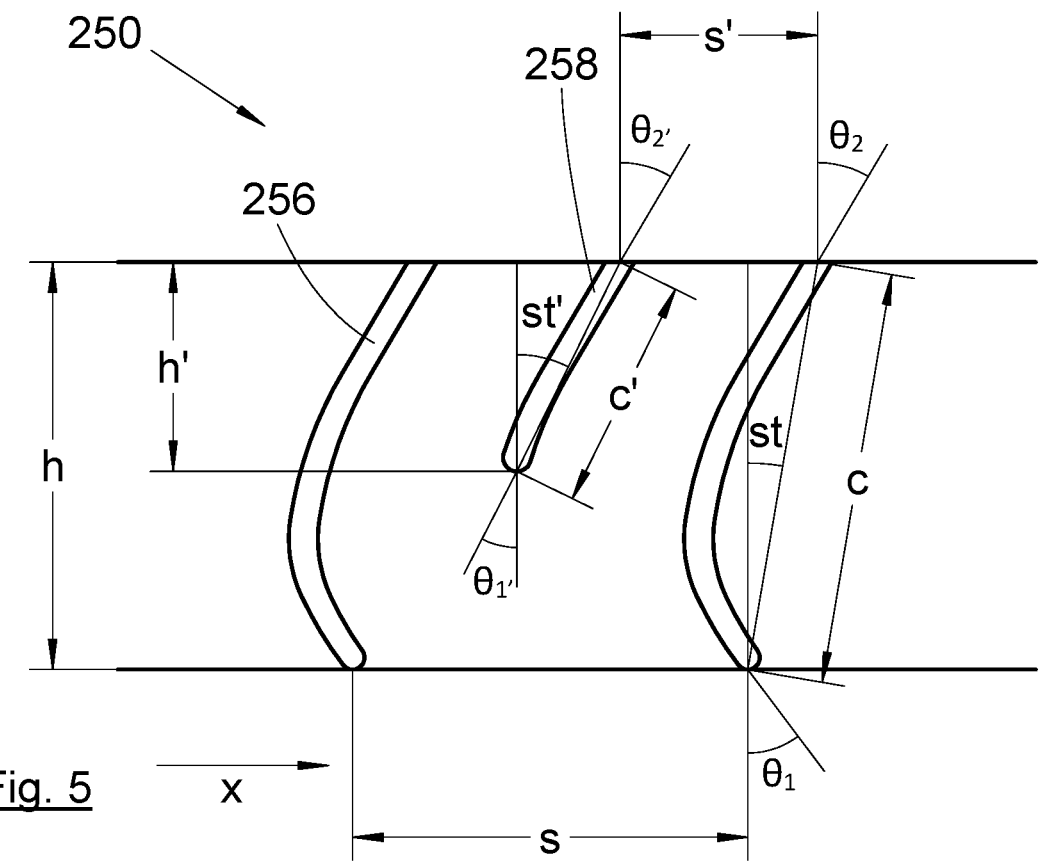
FIG. 5 shows an enlargement of a part of the grating of FIG. 4.

FIG. 5 shows an enlargement of the grating 250 where:
"c" is the chord of the fins 256 of the first type,
"c'" is the chord of the fins 258 of the second type,
"s" is the distance between two consecutive fins 256 of the first type in the forward to aft direction,
"s'" is the distance between a fin 256 of the first type and a consecutive fin 258 of the second type in the forward to aft direction,
"h" is the height of the fins 256 of the first type,
"h'" is the height of the fins 258 of the second type,
"θ1" is the input angle between the tangent to the curvature of the leading edge of the fins 256 of the first type and the vertical axis,
"θ1'" is the input angle between the tangent to the curvature of the leading edge of the fins 258 of the second type and the vertical axis,
"θ2" is the output angle between the tangent to the curvature of the trailing edge of the fins 256 of the first type and the vertical axis,
"θ2'" is the output angle between the tangent to the curvature of the trailing edge of the fins 258 of the second type and the vertical axis,
"st" is the offset angle of the fins 256 of the first type, that is to say the angle between the chord and the vertical axis, and
"st'" is the offset angle of the fins 258 of the second type, that is to say the angle between the chord and the vertical axis.

The vertical axis is taken here with reference to FIGS. 2 to 6, but this axis is more generally a radial direction of the turbofan engine 100. Furthermore, different thickness laws can be applied to the profile of the fins.

According to a particular embodiment, the fins 256 of the first type and the fins 258 of the second type are such that:

$$0.2 \times s \leq s' \leq 0.8 \times s;$$

$$0.2 \times h \leq h' \leq 0.8 \times h; \text{ with } 30 \text{ mm} \leq h \leq 70 \text{ mm};$$

$$-1.5 \times \theta_1 \leq \theta_{1'} \leq 1.5 \times \theta_1; \text{ with } -10° \leq \theta_1 \leq 70°;$$

$$-1.5 \times \theta_2 \leq \theta_{2'} \leq 1.5 \times \theta_2; \text{ with } 0° \leq \theta_2 \leq 50°;$$

$$c' = \frac{h'}{\cos(st')} \text{ with } 0° \leq st' \leq \theta_{2'}; \text{ and}$$

$$0.5 \leq \frac{c}{s} \leq 2; \text{ with } c = \frac{h}{\cos(st)} \text{ and } 0° \leq st \leq \theta_2.$$

Figure 6:
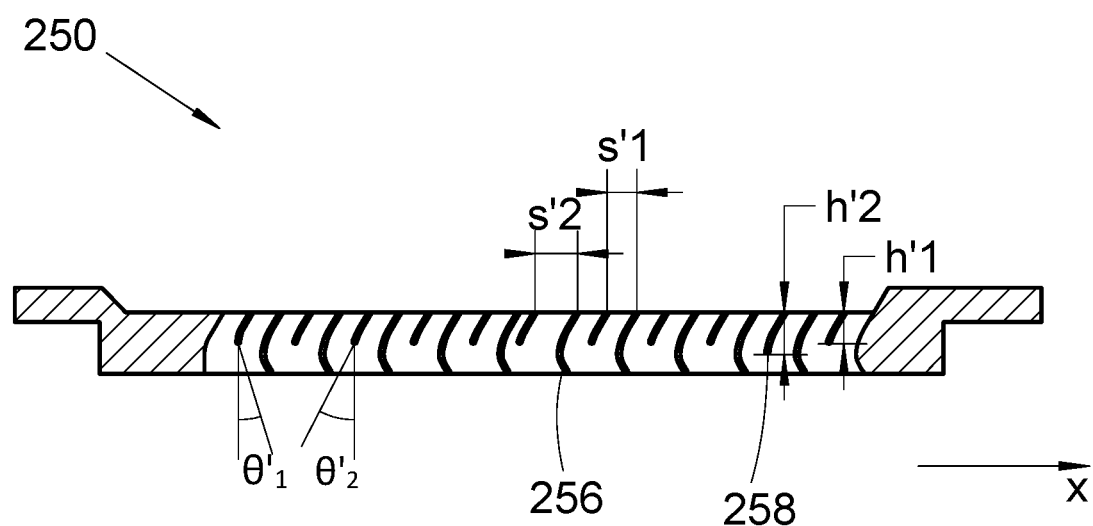
FIG. 6 shows a side view of a grating according to different embodiments.

FIG. 6 shows different variants which can be implemented independently of one another or in combination with one another.

According to a first variant, the heights of the fins 258 of the second type vary from one fin 258 of the second type to another fin 258 of the second type. These variations are represented by different heights $h_1'$, $h_2'$.

According to a second variant, the distance between a fin 256 of the first type and the consecutive fin 258 of the second type in the forward to aft direction, is different from the distance between another fin 256 of the first type and the fin 258 of the second type consecutive in the forward to aft direction to this other fin 256 of the first type. These variations are represented by different distances $s_1'$, $s_2'$.

According to a third variant, the input angles of the fins 258 of the second type vary from one fin 258 of the second type to another fin 258 of the second type. These variations are represented by different angles $\theta_1'$, $\theta_2'$.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A grating for forming a reverse flow of a turbofan engine having a forward longitudinal end and an aft longitudinal end and a lateral width, the grating comprising:
fins of a first type having a curved profile when viewed in a lateral direction relative to the grating, a rounding of the curved profile being configured to be oriented aft and whose center of curvature is forward relative to the fin of the first type,
fins of a second type, wherein a chord of the fins of the second type is smaller than a chord of the fins of the first type,
wherein the fins of the first type and the fins of the second type are disposed in an alternating arrangement along the grating, and
wherein each fin of the second type has a curved profile when viewed in a lateral direction relative to the grating, a rounding of the curved profile being configured to be oriented aft and whose center of curvature is forward relative to the fin of the second type.

2. The grating according to claim 1, wherein the trailing edges of the fins of the first type and the trailing edges of the fins of the second type are in one and the same output plane.

3. The grating according to claim 2, wherein the leading edges of the fins of the first type are in one and the same input plane parallel to the output plane, and wherein the leading edge of each fin of the second type is in an intermediate plane between the input plane and the output plane and at a distance from each of the input and output planes.

4. The grating according to claim 1, wherein:

$$0.2 \times s \leq s' \leq 0.8 \times s;$$

$$0.2 \times h \leq h' \leq 0.8 \times h; \text{ with } 30 \text{ mm} \leq h \leq 70 \text{ mm};$$

$$-1.5 \times \theta_1 \leq \theta_{1'} \leq 1.5 \times \theta_1; \text{ with } -10° \leq \theta_1 \leq 70°;$$

$$-1.5 \times \theta_2 \leq \theta_{2'} \leq 1.5 \times \theta_2; \text{ with } 0° \leq \theta_2 \leq 50°;$$

$$c' = \frac{h'}{\cos(st')} \text{ with } 0° \leq st' \leq \theta_{2'}; \text{ and}$$

$$0.5 \leq \frac{c}{s} \leq 2; \text{ with } c = \frac{h}{\cos(st)} \text{ and } 0° \leq st \leq \theta_2;$$

where "c" is the chord of the fins of the first type,
"c'" is the chord of the fins of the second type,
"s" is a distance between two consecutive fins of the first type,
"s'" is a distance between a fin of the first type and a consecutive fin of the second type,
"h" is a height of the fins of the first type,
"h'" is a height of the fins of the second type,
"θ1" is an input angle between a tangent to a curvature of the leading edge of the fins of the first type and a vertical axis,
"θ1'" is an input angle between s tangent to a curvature of the leading edge of the fins of the second type and the vertical axis,
"θ2" is an output angle between a tangent to a curvature of the trailing edge of the fins of the first type and the vertical axis,
"θ2'" is an output angle between a tangent to a curvature of the trailing edge of the fins of the second type and the vertical axis,
"st" is an offset angle of the fins of the first type, and
"st'" is an offset angle of the fins of the second type.

5. The grating according to claim 1, wherein heights of the fins of the second type vary from one fin of the second type to another fin of the second type.

6. The grating according to claim 1, wherein a distance between a fin of the first type and a consecutive fin of the second type in a forward to aft direction, is different from a distance between another fin of the first type and a consecutive fin of the second type in the forward to aft direction to this other fin of the first type.

7. The grating according to claim 1, wherein input angles of the fins of the second type vary from one fin of the second type to another fin of the second type.

8. A turbofan engine comprising at least one grating for forming a reverse flow according to claim 1.

9. An aircraft comprising at least one turbofan engine according to claim 8.

10. A grating for forming a reverse flow of a turbofan engine having a forward longitudinal end and an aft longitudinal end and a lateral width, the grating comprising:
fins of a first type having a curved profile when viewed in a lateral direction relative to the grating, a rounding of the curved profile being configured to be oriented aft and whose center of curvature is forward relative to the fin of the first type,
fins of a second type, wherein a chord of the fins of the second type is smaller than a chord of the fins of the first type,
wherein the fins of the first type and the fins of the second type are disposed in an alternating arrangement along the grating.

* * * * *